March 1, 1932.  C. A. CAMPBELL  1,847,068

COMBINED CHECK VALVE AND STRAINER

Filed March 23, 1931

Inventor
Charles A. Campbell
By Dodge
Attorneys

Patented Mar. 1, 1932

1,847,068

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

COMBINED CHECK VALVE AND STRAINER

Application filed March 23, 1931. Serial No. 524,741.

This invention relates to combined check valve and strainer units, and particularly to devices of this character suited for use in a wide range of pressure fluid operated devices.

The device was developed particularly for use in air brakes and will be described as so applied.

A preferred embodiment of the invention is illustrated in the accompanying drawings, in which,—

Figure 2:
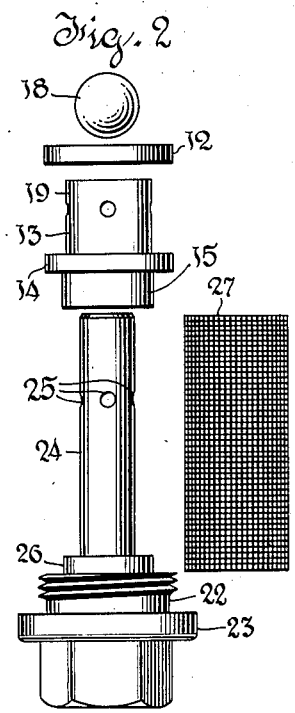
Fig. 2 represents in elevation the removable components, disassembled.
Figure 1:
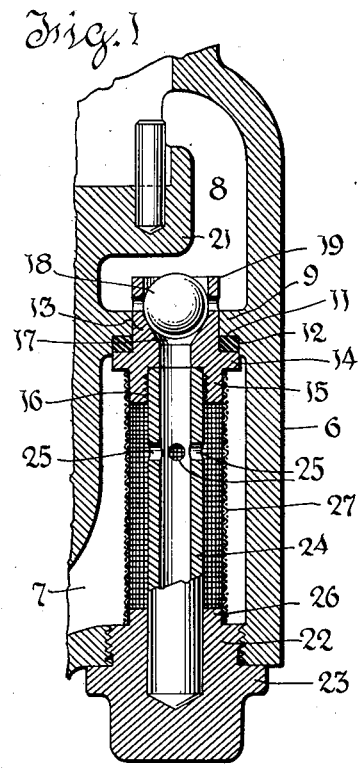
Fig. 1 is a vertical axial section of the device in position in a portion of a triple valve body.

At 6 is represented a portion of the body or housing in which the check valve and strainer are mounted. In the particular example chosen for illustration this is a portion of the lower case of a triple valve, but the exact nature of the device is immaterial.

In the body 6 is a supply passage 7 and a discharge passage 8, between which flow occurs through the strainer and under the control of the check valve. The two passages 7 and 8 are separated by a ported partition 9, the port in the partition being surrounded by a seat 11 for a gasket 12.

Extending through the port in partition 9 is a valve seat member 13 having an encircling flange 14 which seats on gasket 12, and having below flange 14 a hollow cylindrical portion 15 to center the upper end of the strainer. The interior of the portion 15 is threaded as indicated at 16 to receive a threaded rod known as a "puller" (not illustrated) used to pull the valve seat member out in case it sticks to the gasket.

A port extends through the valve seat member 13 and leads to a conical valve seat 17 for a ball check valve 18. The ball valve 18 is retained by a ported annular flange 19 and by an overhanging portion 21 of the body 6.

The body 6 is formed, opposite the seat 11, with a threaded aperture which is closed by a threaded plug 22 which has a sealing flange 23 to limit its insertion. The plug 22 carries, preferably fixed in it, a tubular thrust stem 24, with lateral ports 25 leading to its bore. The stem 24 is open at its upper end and projects into the hollow cylindrical portion 15. There is no threaded engagement between the stem 24 and the valve seat member 13, but the end of the stem abuts against the valve seat member and forces it inward so that flange 14 compresses gasket 12.

There is a cylindrical boss 26 on the plug, of the same external diameter as the extension 15. A cylindrical strainer 27 closely encircles boss 26 and extension 15, at its ends, and bridges the interval between them. Thus air must pass from passage 7 through strainer 27 and ports 25 to the bore of stem 24. Thence it passes through the seat member 13 and between valve seat 17 and valve 18 to passage 8.

Figure 3:
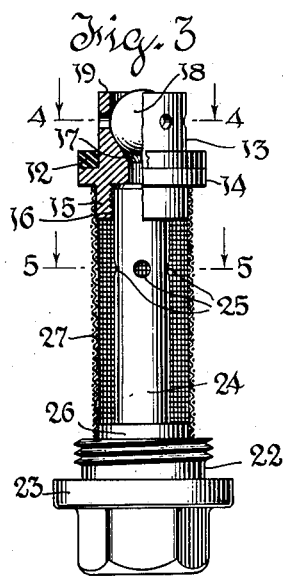
Fig. 3 is a view partly in elevation and partly in section, showing the removable components assembled and ready for insertion into the body.
Figure 4:
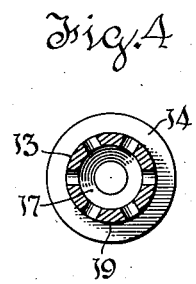
Fig. 4 is a section on the line 4—4 of Fig. 3.
Figure 5:
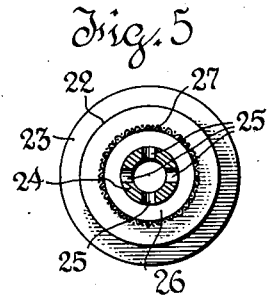
Fig. 5 is a section on the line 5—5 of Fig. 3.

Fig. 2 shows the removable parts disassembled for inspection and cleaning, while Fig. 3 shows them assembled and ready for insertion into the body 6 as a unit.

The device is simple and inexpensive to construct, and convenient to maintain. Most of the maintenance involves merely occasional cleaning.

What is claimed is,—

1. The combination of a body having a seat for a removable valve seat member, and a threaded aperture opposed thereto; a removable valve seat member mounted against said seat in the body; a valve coacting with the seat in said member; a plug threaded into said aperture and having a tubular ported extension entering into thrust relation with said valve seat member; and a cylindrical strainer surrounding said extension, embracing at its ends portions of said seat member and plug and extending between the same.

2. The combination with a body having two chambers communicating with each other by a passage surrounded by a seat, and a threaded opening opposed to said seat, of a ported valve seat member inserted in said passage and having an encircling portion coacting with said seat; a plug screwed into said threaded opening, and having a ported tubular extension in thrust engagement with said valve seat member, the bore of said extension communicating with the port in said seat member; a check valve coacting with said valve seat member and a cylindrical strainer encircling a portion of said valve seat member and a portion of said plug and extending between the two.

3. The combination of a body having a seat for a removable valve seat member, and a threaded aperture opposed thereto, formed with a portion overhanging said seat on the side away from said threaded aperture; a removable ported valve seat member mounted therein; a valve coacting with said seat and confined in coactive relation with said seat member by said overhanging portion; a plug threaded into said aperture and having an extension entering into thrust relation with said seat member; and a cylindrical strainer encircling said extension, embracing at its ends portions of said plug and seat member, and extending between the same.

In testimony whereof I have signed my name to this specification.

CHARLES A. CAMPBELL.